United States Patent [19]

Clifton

[11] 4,142,832
[45] Mar. 6, 1979

[54] FLUID CURRENT MOTOR
[76] Inventor: Woodrow W. Clifton, P.O. Box 822, St. Augustine, Fla. 32804
[21] Appl. No.: 790,381
[22] Filed: Apr. 25, 1977
[51] Int. Cl.² .............................................. F03D 3/06
[52] U.S. Cl. .................................. 416/117; 416/197 A
[58] Field of Search ............... 416/111, 117, 119, 140, 416/197 A

[56] References Cited

U.S. PATENT DOCUMENTS

| 244,677 | 7/1881 | Sherwood | 416/117 |
|---|---|---|---|
| 665,891 | 1/1901 | Fetty | 416/117 |
| 797,140 | 8/1905 | Miller | 416/117 |
| 948,105 | 2/1910 | Campbell | 416/117 |
| 2,441,635 | 5/1948 | Iverson | 416/158 X |

FOREIGN PATENT DOCUMENTS

| 498294 | 1/1951 | Belgium | 416/117 |
|---|---|---|---|
| 854330 | 11/1952 | Fed. Rep. of Germany | 416/117 |
| 979579 | 4/1951 | France | 416/117 |
| 2290583 | 6/1976 | France | 416/117 |
| 52384 | 2/1920 | Sweden | 416/117 |

*Primary Examiner*—Everette A. Powell, Jr.
*Attorney, Agent, or Firm*—George H. Baldwin; Arthur G. Yeager

[57] ABSTRACT

A fluid current motor having a rotatable shaft, a plurality of rotor arms rigidly mounted to and extending radially outwardly from the shaft and a plurality of pairs of superposed rotor panels which pairs are pivotally mounted respectively to each said rotor arm, may be improved by providing a rigid connector between each pair of panels moveably connecting a leading portion of one rotor panel in each said pair to a trailing portion of the second rotor panel in each said pair such that the rotor panels in each pair of rotor panels will coactingly pivot between resisting and non-resisting positions in response to a fluid current.

10 Claims, 9 Drawing Figures

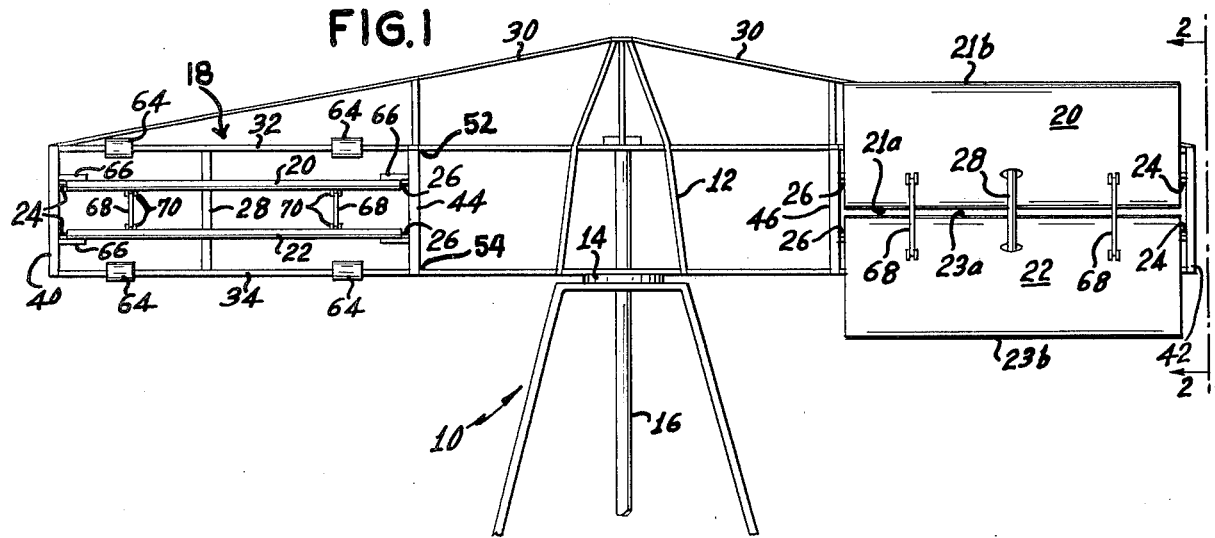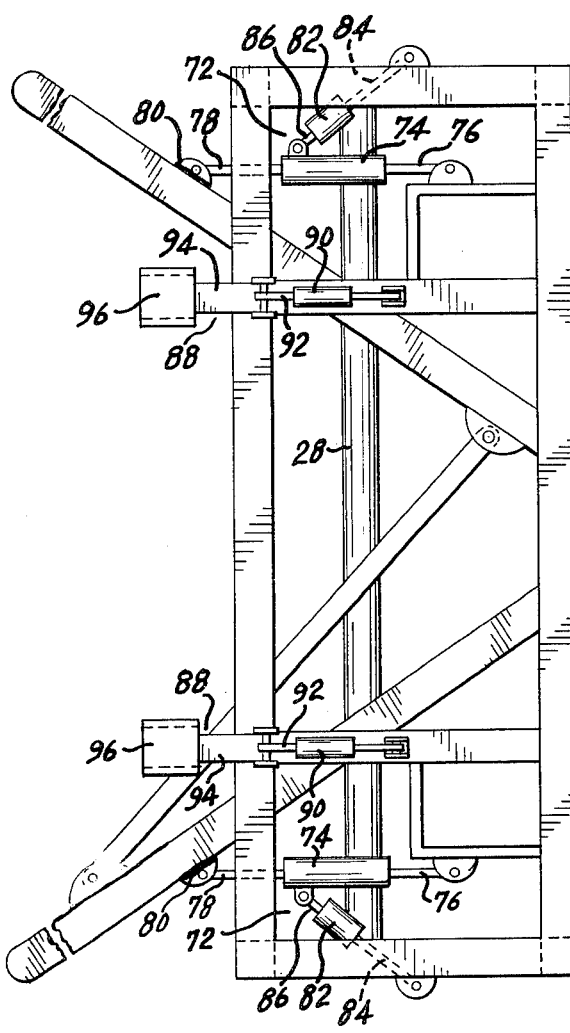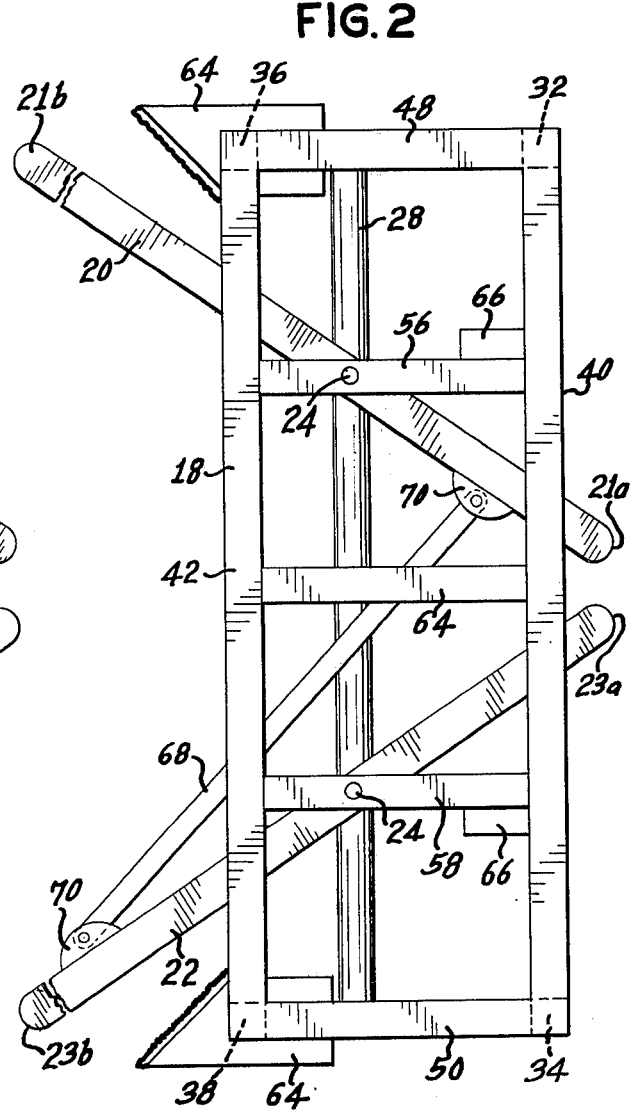

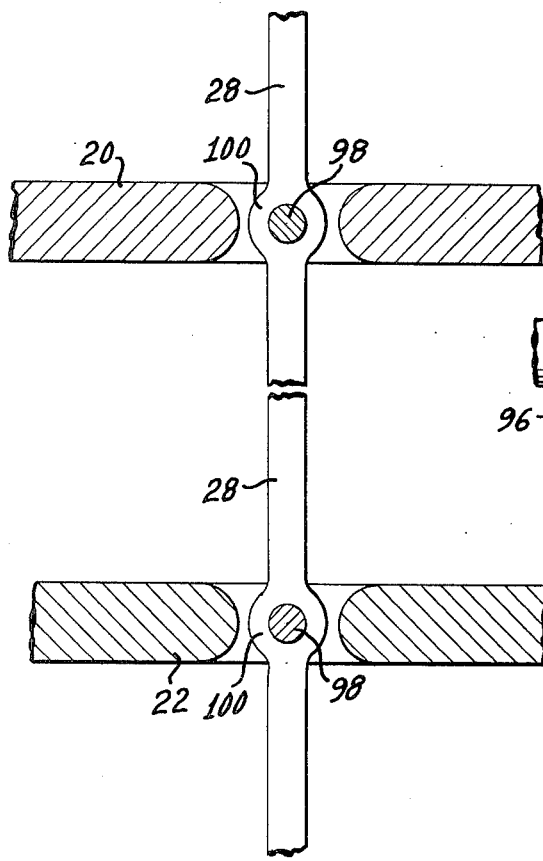
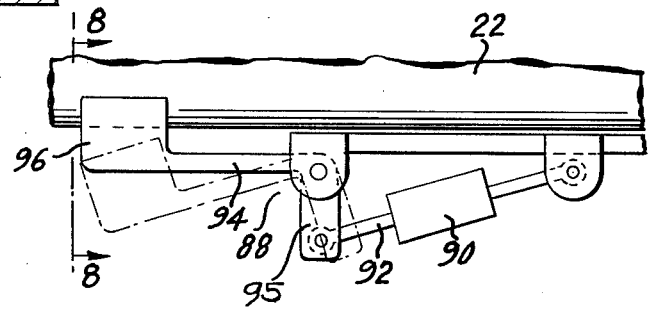
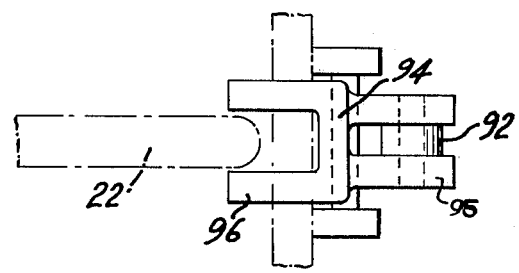
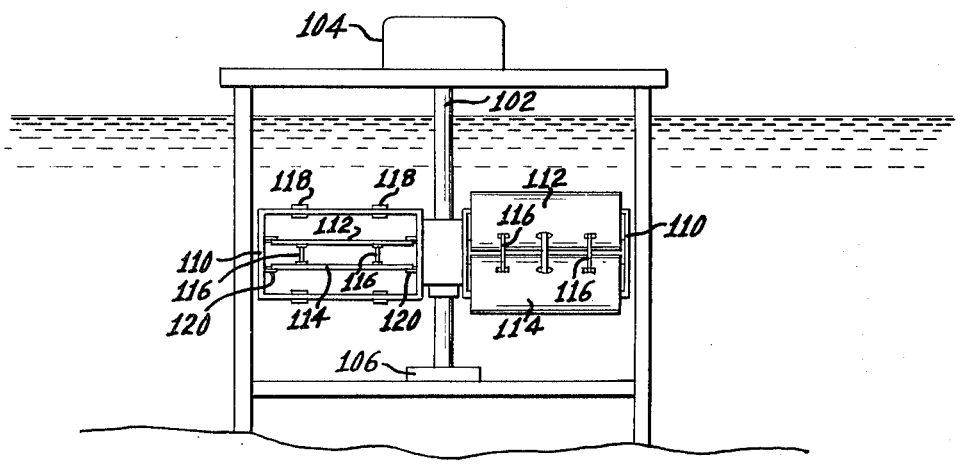

FLUID CURRENT MOTOR

BACKGROUND OF THE INVENTION

This invention relates generally to fluid current motors and particularly to such motors which are equipped with pairs of moveable rotor panels.

The use of fluid current motors such as windmills and watermills has been well known for centuries. Such motors conventionally include a rotatable shaft and a series of fluid current resisting panels operatively connected to the shaft. These panels are arranged with respect to the shaft such that the impingment of a fluid current will cause a force to build upon the panel surface thereby causing movement of the panel, which movement ultimately results in the rotation of the power shaft, thereby harnessing wind and water power.

As is well known to those skilled in the art, fluid current motors may be divided into two main classes. These are: (a) motors having the effective surfaces of their panels moving in the direction of the wind; and (b) motors whose panels move in a plane, or planes, perpendicular to the direction of the wind. Fluid current motors of the class (a) type suffer from the disadvantage that the panels, which move generally with the wind during one portion of a revolution of the shaft, must move against the wind during an equal portion of a revolution.

Various inventors have attempted to overcome this disadvantage by constructing fluid current motors of the class (a) type which have moveable or pivotable panels which offer less resistance when rotating into the wind than when rotating with the wind.

A fluid current motor having pivotable rotor panels is disclosed in U.S. Pat. No. 346,797 to Aylsworth. The Aylsworth patent discloses a windwheel having a vertical rotatable shaft, four horizontal rotor arms mounted to, and extending radially from, the shaft, each arm carrying a pair of rotor panels individually pivotally mounted to the arm with their individual pivot axes in parallel spaced relation to each other. Each panel has a leading portion terminating in a leading edge and a trailing portion terminating in a trailing edge with the pivotal mounting axis of each panel separating the leading and trailing portions. For the purposes of this disclosure, the term leading is defined to identify the portion of the fluid current rotor arm or panel which is facing in the same peripheral direction as the direction of rotation of the shaft. Conversely the term trailing is defined to identify the portion of the rotor arm or panel which is facing in the opposite direction. In addition, when the panels in a pair of rotor panels are oriented parallel to each other, that particular orientation is termed "non-resisting", whereas, when the panels are oriented with their leading edges closely adjacent and their trailing edges remote, the orientation is termed "resisting".

In operation, impingement of a fluid current on the leading edge of a rotor panel in the Aylsworth device will cause the panel to pivot into a horizontal, or non-resisting, alignment, whereas impingement of a fluid current upon the trailing edge of a panel will cause the panel to pivot into a resisting position in which a portion of one surface of the panel is exposed to the force of the fluid current and in which the leading portion of the rotor panel is forced to rest against the rotor arm.

While the Aylsworth device solves at least a part of the wind resistance problem associated with class (a) fluid current motors by having its rotor panels pivot into a non-resisting orientation when rotating into the wind, the device performs with less than optimum efficiency due to the fact that the independent pivotability of each panel allows the panels to flutter during the rotation cycle. This flutter allows a part of the fluid current to escape respectively over and under the upper and lower trailing edges of the panel pairs and through the opening between the leading edges during the portion of a rotation cycle in which the pairs are in a resisting orientation.

Various inventors have attempted to solve the latter problem, i.e. fluid escape between the leading edges, by constructing rotor panel pairs which are hinged at their leading edges. Examplary of such fluid current motors are those disclosed in U.S. Pat. Nos. 13,268 to Morgan; 244,677 to Sherwood; 257,210 to Casterline; 427,846 to Garcia - Sanchez; 766,801 to Allen; 948,105 to Campbell; and 1,447,686 to Oswald. Fluid current motors constructed with a plurality of such hinged pairs of rotor panels successfully solve the problem of fluid current losses between the rotor panels when in their resisting orientation, fluttering, which allows fluid escape around the trailing edges remains. However, by moving the pivotal axis of the rotor panels to coincide with a hinge axis at the leading edges of the panels, there results an increased tendency for the pairs of panels, to remain in a non-resisting orientation when a fluid current impinges upon their trailing edge. To counteract this tendency several of the aforementioned patentees have added weights, extending outwardly beyond the leading edges of the panels, in order to counter-balance the panel weight and thereby obtain a gravity assisted opening. However, despite such modifications, the drawbacks associated with independent panel motion persist.

One attempted solution to the problem of independent panel motion in fluid current motors having hinged pivotable panels is that shown in U.S. Pat. No. 354,972 to Dodds et al. The Dodds et al patent discloses discrete hinged pairs of rotor panels with the hinged common leading edge being, in turn, mounted to a rotor arm. Each panel is rigidly pivotally connected to a common block which, in turn, is slidably mounted to a slide bar having a terminal stop. In operation, impingement of a fluid current upon the hinged leading edges of a pair of rotor panels will cause the rotor panels to pivot about the hinge into a non-resisting orientation, while impingement of a fluid current upon the trailing edges of the pair will cause the rotor panels to pivot into a resisting orientation. Due to the pivotal connection between each of the panels and the slidable block, the panels will be forced to open and close co-actingly. By virtue of such co-action, the individual panels in each pair exert a stabilizing influence on each other with respect to relative motion.

Despite its attempted solution to the problem of motion between the individual rotor panels of a pair, the Dodds et al device suffers from the disadvantage associated with leading edge hinging, namely a tendency to remain in a non-resisting orientation. In addition the number of interrelated elements necessary to obtain co-action results in substantial maintenance and replacement difficulties.

It is therefore an object of this invention to provide a fluid current motor having discrete pairs of co-actingly pivotable rotor panels which will minimize wind resistance during that portion of a rotation cycle in which the pair is traveling against the fluid current.

It is a further object to provide such a pair of co-actingly pivotable rotor panels which will maximize fluid current resistance during that portion of a rotation cycle in which the pair is traveling with the fluid current.

It is a still further object of this invention to provide such a fluid current motor which will utilize a minumum number of elements to accomplish its function so as to minimize the amount of maintenance and repair operations necessary to maintain operation.

SUMMARY

It has now been discovered that a fluid current motor having a rotatable shaft, a plurality of radially outwardly extending rotor arms, and a plurality of pairs of rotor panels carried respectively by said rotor arms, each said rotor panel of each said pair respectively pivotally mounted to said rotor arms on pivotal axis extending parallel to said rotor arms and in parallel spaced relation to each other wherein the individual pivotal axis divide each individual rotor panel into a leading portion terminating in a trailing edge and a trailing portion terminating in a trailing edge, may be provided with a plurality of elongated rigid connecting means moveably connecting the leading portion of one rotor panel in each pair with the trailing portion of the other rotor panel in each pair so as to provide a connection therebetween which causes the pairs of panels to co-actingly pivot between resisting and non-resisting orientations in response to the impingement of fluid current.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing(s) in which:

FIG. 1 is front elevational view of a fluid current motor constructed in accordance with my invention;

FIG. 2 is an end elevational view on an enlarged scale of a rotor arm assembly taken along line 2—2 of FIG. 1;

FIG. 5 is a detailed end elevational view of a rotor arm assembly including rotor panels in a resisting orientation;

FIG. 6 is a partial transverse vertical section taken along the line 6—6 of FIG. 4;

FIG. 7 is a side elevational view of an adjustable clamp;

FIG. 8 is an end elevational view of the adjustable clamp taken along line 8—8 of FIG. 7; and FIG. 9 is a front elevational view of a fluid current motor constructed in accordance with my invention specifically adapted for use with water currents.

DESCRIPTION OF THE PREFERRED EMBODIMENT

Figure 3:
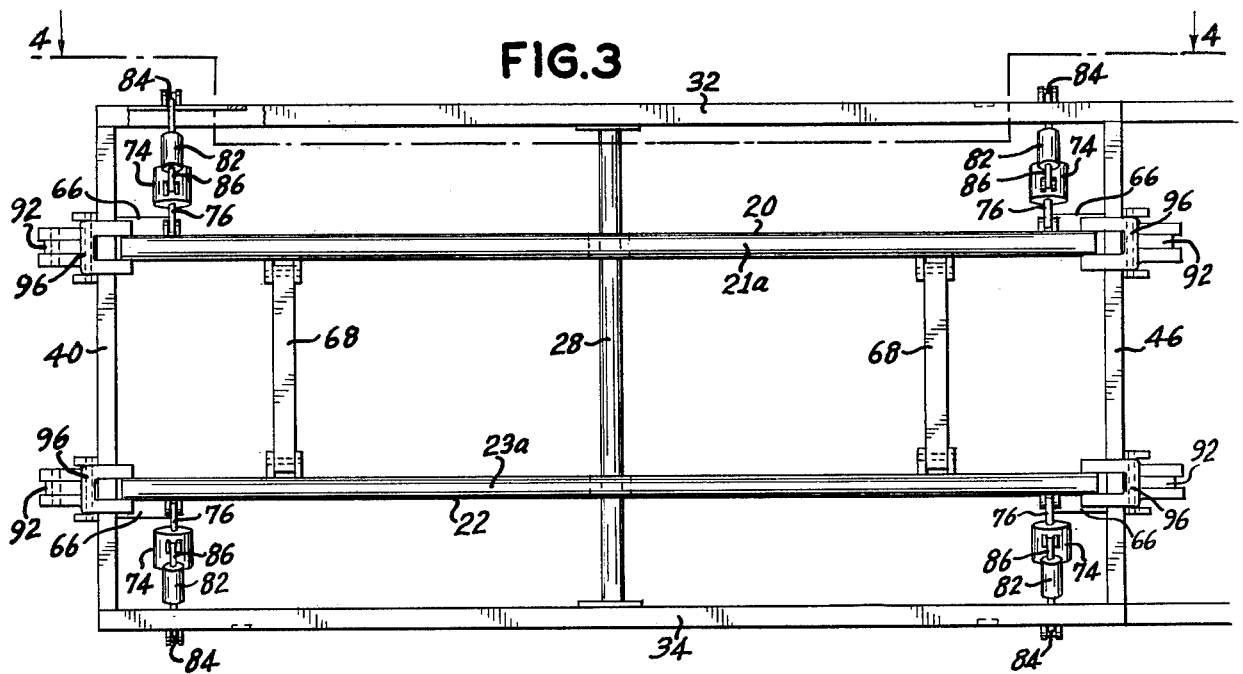
FIG. 3 is a detailed front elevational view of a preferred embodiment of a rotor arm including rotor panels in a non-resisting orientation.

Referring to FIGS. 1 and 2 there is seen a windmill tower 10 having a cage work 12 rotatably mounted thereto through rotatable mount 14. Rotatable shaft 16 is rotatably held by mount 14 and extends downwardly therethrough to a power conversion center not shown. An upper portion of shaft 16 is rigidly connected to cage work 12.

A plurality of rotor arms 18 are rigidly mounted to, and extend radially outwardly from, cage work 12 and are rigidly connected therethrough to rotatable shaft 16. Each rotor arm 18 is equipped with at least one pair of pivotable rotor panels, having an upper pivotable panel 20 and a lower pivotable panel 22. Each such pair of panels is pivotably mounted to the arm at outer end pivot points 24 and inner end pivot points 26, in such a way as to provide a leading portion terminating in a leading edge 21a and 23a respectively and a trailing portion terminating in a trailing edge 21b and 23b respectively. In addition, a rotor panel brace 28 may be rigidly mounted to the arm and pivotably mounted to a central point in each panel of each of said pairs respectively at a distance intermediate their length in order to prevent any gravity induced deformation in the panel. The pivotal axes of the pivotable mountings between panel brace 28 and each panel are coincident with the pivot axes between inner and outer pivot mounts 26 and 24 of each individual panel. A plurality of support means such as cables 30 may be provided between the cagework 12 and the rotor arms in order to lend additional support to the rotor arms of the motor.

As is shown more clearly in FIG. 2, each rotor arm is fabricated in the form of an elongated regular paralleipipid having an upper leading horizontal member 32, a lower leading horizontal member 34, an upper trailing horizontal member 36, a lower trailing horizontal member 38, an outer leading vertical member 40, an outer trailing vertical member 42, an inner leading vertical member 44, an inner trailing vertical member 46, an upper outer horizontal cross-member 48, a lower outer horizontal cross-member 50, an upper inner horizontal cross-member 52, and a lower inner horizontal cross-member 54. In addition, each rotor arm is provided with upper and lower outer rotor panel pivot support cross-members 56 and 58 respectively, and corresponding upper and lower inner rotor panel pivot support cross-members not shown respectively each of which members is mounted between the leading and trailing vertical members at their respective ends of the rotor arm. Furthermore, each rotor arm is provided with both an upper and a lower panel brace support cross-member, not shown, which are mounted between horizontal members 32 and 36 and between horizontal members 34 and 38 respectively at a point intermediate the respective length of the horizontal members and which support the upper and lower ends respectively of panel brace 28. Finally, additional rotor arm stabilizing members, such as that shown at 64, may be utilized at any suitable site in the rotor arm framework in order to provide additional structural stability to the rotor arm.

In order to restrict the pivoting motion of the individual rotor panels to within a desired range, a number of stop bumper means, preferably having rotor panel contact faces fabricated from a deformable material such as rubber, polyurethane or the like, may be provided. As shown in FIGS. 1 and 2, one or more stop bumper means such as trailing portion stop bumper 64 may be mounted to the upper and lower trailing horizontal members at spaced intervals along the length of the individual members such that the rotor panels will be restricted to a maximum resisting orientation. In like fashion, a number of stop bumper means such as leading portion stop bumpers 66 are mounted to the upper and lower and inner and outer rotor panel pivot support cross members, 56, 58, 60 and 62 respectively at points adjacent to their intersection with inner and outer leading vertical members 44 and 40 respectively. As shown in FIGS. 1 and 2, these leading portion stop bumpers 66 may be mounted above the intersections between members 56 and 40 and 62 and 44 and inwardly of the parallelipipid framework so as to restrict the pivot of each panel to that in which each assumes a horizontal, non-resisting orientation.

Between each pair of rotor panels, 20 and 22, is at least one elongated rigid means for moveably connecting the leading portion of one panel to the trailing edge of the other such as rigid connector 68. As shown in FIG. 2, rigid connector 68 may have one end pivotally mounted to the leading portion of upper rotor panel 20 and have its other end pivotally mounted to the trailing portion of lower rotor panel 22. The two mountings on either end of rigid connector 68 may be pivot mounts 70 which are rigidly secured to each portion of the respective rotor panels and which are pivotally connected to the respective ends of the rigid connector 68 with pivot axes which are parallel to the pivotal axes of the individual rotor panels. The length of rigid connector 68 and the position of pivotal mounts 70 on the individual panels are pre-selected to be consistant with the mode of functionality described hereinbelow.

Figure 4:
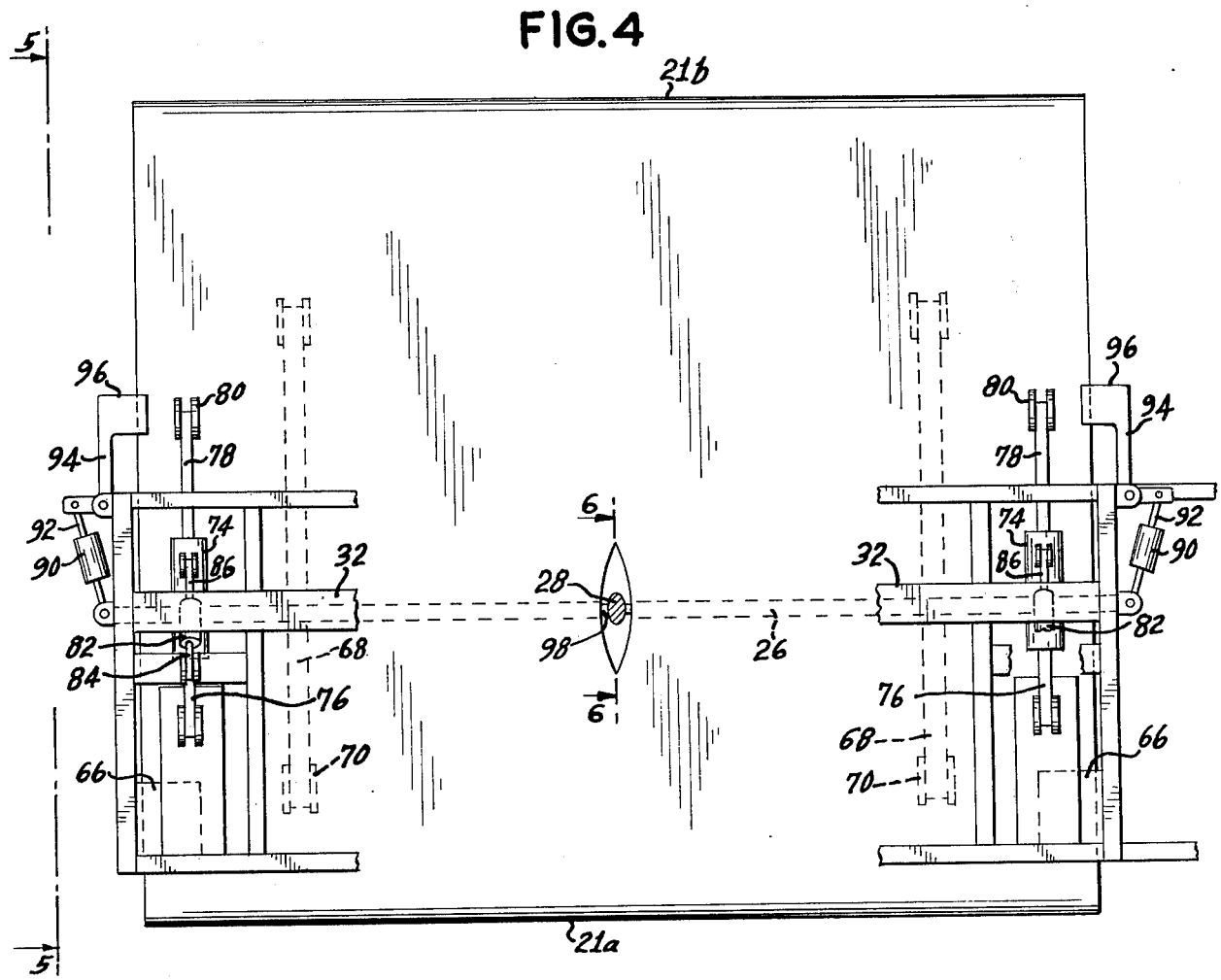
FIG. 4 is a detailed plan view partly in section of the arm taken along line 4—4 of FIG. 3.

FIGS. 3, 4, and 5 show an alternative preferred embodiment of the invention in which trailing portion stop bumpers 64 have been replaced by variable position stop bumper means 72 and in which adjustable clamps 88 have been added for holding the individual rotor panels in a horizontal non-resisting orientation.

Variable position bumper stop means 72 may comprise a first hydraulic or pneumatic cylinder 74 pivotally anchored to the rotor arm 18 by first anchor shaft 76. First extendable shaft 78, having pivotal bumper stop 80 mounted to the outer end thereof, is carried by first extendable shaft 78 to vary the distance between said cylinder and bumper stop 80 in a generally horizontal direction. Variable position stop means 72 is also provided with a second hydraulic or pneumatic cylinder 82 having one end anchored to the rotor arm by second anchor shaft 84 and having second extendable shaft 86 carried by, and extending from, the other end of second cylinder 82 which shaft, in turn, is pivotally mounted to first cylinder 74, such that actuation of second hydraulic or pneumatic cylinder 82 by actuation means, not shown, will cause second extendable shaft 86 to vary the distance between second cylinder 82 and first cylinder 74 thereby varying the position of bumper stop 80 in a generally vertical direction.

Adjustable means for clamping such as clamps 88 may be mounted to rotor panel pivot support cross-members 56, 58, 60 and 62 outwardly of the rotor arm framework such that upper and lower rotor panels 20 and 22 may be held in a horizontal or non-resisting orientation when desired. As shown more clearly in FIGS. 7 and 8, clamps 88 may comprise an extensible shaft means for connecting such as third hydraulic or pneumatic cylinder 90 having one end pivotally anchored to the respective pivot support cross-member by an anchor shaft and having third extendable shaft 92 extending from the other end. Each clamp 88 is provided with a rigid engaging clamp means having an elongated neck 94, and a bifurcated panel gripping end 96 carried by the trailing end of the neck and extending normal thereto toward the rotor panel. The second end of neck 94 is pivotally mounted to outer trailing vertical member 42 by extensible shaft interconnect 95 about a pivot axis such that bifurcated panel gripping end 96 may be pivotable into a panel gripping relationship with the trailing portion of a panel. Elongated neck 94 is pivotally connected to extendable shaft 92 such that bifurcated panel gripping end 96 may be pivoted into, or away from, such gripping relationship with a panel by actuation of the third hydraulic or pneumatic cylinder 90. This pivotal connection may be accomplished, as shown in FIG. 7, by providing neck 94 with a second bifurcated extension 95 extending normal to the neck and outwardly away from the pivotal connection between the neck and the trailing vertical member and pivotally connecting third extendable shaft 92 to the outwardly directed end of the second bifurcated extension 95.

FIG. 6 shows the pivotal connections between rotor panel brace 28 and upper and lower rotor panels 20 and 22 respectively. Each pivotal connection is made between pivot pins 98, which are rigidly mounted to rotor panels 20 and 22 and extending along the pivotal axis of said panel, and circular bearings 100 held by brace 28.

FIG. 9 discloses a fluid current motor constructed in accordance with the invention and adapted for use with water currents rotatable shaft 102 is rotatably held by upper and lower rotatable mounts 104 and 106 respectively. A power conversion mechanism is operatively attached to said shaft adjacent the end of the shaft above water level. A rigid structural support framework rotatably supports rotatable shaft 102. Rigidly mounted to said shaft and extending radially outwardly therefrom are rotor arms constructed similarly to those shown in FIGS. 1 and 2. Each rotor arm pivotally carries a pair of rotor panels 112 and 114 which are co-actingly connected by rigid connecting means 116. Trailing portion bumper stops 118 are provided above upper panel 112 and below lower panel 114, and leading portion bumper stops 120 are provided such that the individual panels will be restricted to a horizontal position in the non-resisting orientation.

Having described the individual elements in each of the preferred embodiments of my invention, the operation thereof will be obvious to one skilled in the art from the following description.

Referring to FIGS. 1 and 2, a wind current flowing toward the fluid current motor of FIG. 1, and from left to right in FIG. 2, will strike each of the rotor arms 18 with equal amounts of potentially convertable force. As a result of the particular configuration of each rotor arm 18, these forces will cause each rotor arm to respond to the fluid current in a complimentary manner such that the rotatable shaft 16 is driven in a counterclockwise rotation.

Firstly, with regard to the rotor arm on the left side of the shaft 16, in FIG. 1, the fluid current will impinge upon the leading edges of rotor panels 20 and 22 and will proceed along the top and bottom surfaces thereof, finally passing the trailing edges of each panel. During the fluid current passage, the force of the fluid current will tend to orient the panels in a parallel spaced relation to each other, and to maintain that non-resisting orientation by exerting a force upon the upper and lower surfaces respectively of upper rotor panel 20 and lower panel 22. This force will cause leading edges 21a and 23a to be maintained in contact with leading portion stop bumpers 66. By virtue of rigid connector 68, any deviation from a planar orientation by one of the rotor panels must be accompanied by an equal and opposite deviation by the other rotor panel. Due to the parallel planar orientation of each rotor panel, the amount of panel surface area exposed to the fluid current will be minimized and the panels so oriented will offer the minimum resistance to the fluid current. As the motor continues its counter-clockwise rotation, the rotor arm described above will rotate into the wind and pass through a transition orientation in which its outer end is pointed directly into the wind. As it passes through this transition orientation and continues to rotate about rotatable shaft 16, the fluid current which previously impinged primarily on the leading edges 21a and 23a will, ever increasingly, impinge primarily on the trailing edges 21b and 23b of the panels. In so doing, rotor panel 20 will tend to pivot about pivot points 24 and 26 in a clockwise manner and lower panel 22 will tend to rotate in a counter-clockwise manner. Due to the moveable rigid connection provided by rigid connector 68 and pivot mounts 70 which connect the leading portion of upper rotor panel 20 with the trailing portion of lower rotor panel 22, the panels will be caused to pivot about their respective axes co-actingly in equal but opposite amounts. By such co-acting pivotal motion, an increasingly resisting profile is presented to the fluid current and the resultant increased resistance causes an increasing amount of fluid current force to be brought to bear on the mutually opposed surfaces of upper rotor panel 20 and lower rotor panel 22. As a result of such a complimentary relationship, the panels are caused to co-actingly pivot to their maximum deflection from the parallel. In such an orientation, the leading edges 21a and 23a are brought closely adjacent to each other thereby minimizing the amount of fluid current force lost between the panels, and the trailing edges are separated by the maximum distance with the trailing portion stop bumpers 64, thereby maximizing the resisting surface exposed to the fluid current and minimizing the amount of fluid current force lost above and below the pair.

The embodiment of the fluid current motor rotor arm shown in FIGS. 3, 4, and 5 adds two significant operating modes to the principle embodiment shown in FIGS. 1 and 2 by virtue of the inclusion of the variable position stop means 72 and the adjustable clamps 88.

With respect to the variable position stop means 72, the maximum degree of separation between the trailing edges 21b and 23b may be varied by an operator in response to changes in fluid current speed. Thus, during periods of high fluid current speed, it may be desirable to decrease the distance between the trailing edges (and consequently increase the gap between the leading edges) in order to govern the speed of rotation of the motor. Such may be accomplished by the actuation of first and second hydraulic or pneumatic cylinders 74 and 82 respectively, by any conventional actuation means, in order to extend extendable shaft 78 and stop bumper 80 to a position in which the maximum panel deflection is reduced to the level desired. Conversely, low fluid current speed may be accommodated by actuating means 72 so as to retract shaft 78 and bumper 80 to a point allowing greater panel deflection.

With regard to adjustable clamps 88, such clamps are of particular applicability to a situation in which it is desired to bring the fluid current motor to a stop, despite the presence of a fluid current, in order to perform needed maintenance or repair work on portions of the apparatus.

During the normal operation of the motor, adjustable clamps 88 are maintained in a retracted mode in which bifurcated panel gripping end 96 is maintained out of the path of the panel as shown in the dashed portion of FIG. 7. When it is desired to restrict the panels to a non-resisting parallel orientation, variable position stop means 72 is actuated, to extend shaft 78 and stop bumper 80 to their maximum distance. In so doing, the maximum deflection of the trailing portion of each panel will be increasingly reduced until no deflection is obtained and the leading portions of the upper and lower panels are forced thereby into contact with leading portion stop bumpers 66. When each panel is thus restricted to a parallel orientation by means 72, third hydraulic or pneumatic cylinder 90 may be actuated, extending third extendable shaft 92 and thereby pivoting bifurcated panel gripping end 96 into panel-restraining contact with the panel such as is seen in the solid line portion of FIGS. 7 and 8. Variable means 72 may subsequently be retracted if desired, or alternatively, may be left in fully extended portion to assist adjustable clamps 88 in maintaining the parallel orientation of the panels.

The operation of the fluid current motor shown in FIG. 9 for use with water currents is similar to that described for the motor shown in FIG. 1. Impingement of a current of water on the various pairs of rotor panels will cause the individual panels to co-actingly pivot between resisting and non-resisting orientations. Means for varying the maximum resisting orientation and means for holding the panels in a parallel orientation analogous to those disclosed in FIGS. 3, 4, 5, 7 and 8 may be used with equal facility in the motor of FIG. 9 with only minor modifications consistant with their surrounding water environment.

In addition to the elements heretofore described, the fluid current motor of this invention may be equipped with a conventional governor apparatus which will restrict the maximum speed of rotation which may be attained by the motor. Such an apparatus would have particular applicability to the motor shown in FIG. 1 due to the absence therein of variable position stop means 72.

Furthermore, since the fluid current motors of this invention may be used under freezing climatic conditions which may allow the formation of ice, snow and sleet, the individual rotor panels may be equipped with heating means which are remotely operable by an operator so as to de-ice the panels as needed.

Finally, while the particular embodiments of my invention have been shown and described as having two rigid connectors 68, four leading edge stop bumpers, etc., it will be recognized by those skilled in the art that the number necessary are utilized only to increase the efficiency or the safety of operation, and no limitations as to numbers of elements over and above that minimum number required should be implied.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In an improved fluid current motor comprising a rotatable shaft substantially normal to a fluid current, a plurality of radially outwardly extending parallelepiped structural framework arms rigidly mounted to said rotatable shaft for rotation therewith, a plurality of pairs of generally planar rotor panels respectively pivotally mounted to and within each said structural framework arm on pivotal spaced axes generally normal to said shaft, each said rotor panel including a leading portion terminating in a leading edge and a trailing portion terminated in a trailing edge, the pivotal axis of each said rotor panel being located between said leading and trailing portions and connector means for moveably connecting said leading portion of one rotor panel of each said pair of rotor panels to said trailing portion of the second panel of the same said pair of rotor panels, so constructed and arranged that impingement of a fluid current upon the leading edge of either panel of each said pair of rotor panels will cause said pair of rotor panels to co-actingly pivot about their respective said pivotal axes into a generally non-resisting parallel spaced relationship and that impingement of a fluid current upon the trailing edge of either panel of each said pair of rotor panels will cause said pair of rotor panels to co-actingly pivot about their respective said pivotal axes to a resisting position in which the respective leading edges of each of said rotor panels in each said pair of rotor panels are closely adjacent and in which the respective trailing edges are remote.

2. In the fluid current motor as set forth in claim 1, said rotatable shaft comprises a vertically upright rotatable shaft, each of said framework arms extending substantially horizontally outwardly therefrom and each of said pairs of rotor panels comprising an upper rotor panel having an upper surface and a lower surface and a lower rotor panel having an upper surface and a lower surface.

3. In the fluid current motor as set forth in claim 1, wherein each framework arm is rigidly mounted to said rotatable shaft by an inner end and extending outwardly therefrom and having an upper leading horizontal member, a lower leading horizontal member, an upper trailing horizontal member, a lower trailing horizontal member, an outer leading vertical member mounted to and connecting said upper and said lower leading horizontal members adjacent the respective outer ends thereof, an outer trailing vertical member mounted to and connecting said upper and said lower trailing horizontal members adjacent the respective outer ends thereof, an inner leading vertical member mounted to and connecting said upper and said lower leading horizontal members adjacent the respective inner ends thereof, an inner trailing vertical member mounted to and connecting said upper and said lower trailing horizontal members adjacent the respective inner ends thereof, an upper outer horizontal cross-member mounted to and connecting said upper leading and said upper trailing horizontal members adjacent the respective outer ends thereof, an upper inner horizontal cross-member mounted to and connecting said upper trailing horizontal members adjacent the respective inner ends thereof, a lower outer horizontal cross-member mounted to and connecting said lower leading and said lower trailing horizontal members adjacent the respective outer ends thereof, a lower inner horizontal cross-member mounted to and connecting said lower leading and said lower trailing horizontal members adjacent the respective inner ends thereof, an upper outer rotor panel pivot support cross-member, an upper inner rotor panel pivot support cross-member, a lower outer rotor panel pivot support cross-member, and a lower inner rotor panel pivot support cross-member, said inner rotor panel pivot support cross-members rigidly mounted to and connecting said inner leading and said inner trailing vertical members and in parallel spaced relation to said inner horizontal cross-members and therebetween and said outer rotor panel pivot support cross-members mounted to and connecting said outer leading and said outer trailing vertical members and in parallel spaced relation to said outer horizontal cross-members and therebetween, wherein said upper rotor panel of each said pair of rotor panels is pivotally mounted to and between said inner and said outer upper rotor panel support cross-member and said lower rotor panel in each said pair of rotor panels is pivotally mounted to and between said inner and said outer lower rotor panel pivot support cross-member.

4. In the fluid current motor as set forth in claim 3, wherein each said framework arm additionally comprises an upper panel brace support cross-member parallel to and between said inner and said outer upper horizontal cross-members and mounted to and connecting said upper leading and said upper trailing horizontal members, a lower panel brace support cross-member parallel to and between said inner and said outer lower horizontal cross-members and mounted to and connecting said lower leading and said lower trailing horizontal members, and a panel brace mounted to and connecting said upper and said lower panel brace support cross-members at points thereon intermediate their lengths, said panel brace intersecting and pivotally mounted to said first rotor panel and said second rotor panel at superposed points in each said rotor panel such that the pivot axis formed between said panel brace and said first rotor panel is coincident with the pivotal axis of said first rotor panel and such that the pivot axis formed between said panel brace and said second rotor panel is conincident with the pivotal axis of said second rotor panel.

5. In the fluid current motor as set forth in claim 4, wherein said connector means comprises an elongated rod, a first pivotable mount rigidly pivotally mounting a first end of said rod to said lower surface of said leading portion of said upper panel, and a second pivotable mount rigidly pivotally mounting the second end of said rod to said upper surface of said trailing portion of said lower panel, said first and said second pivotable mounts each having a pivot axis parallel to said pivotal axes of said upper and lower rotor panels.

6. In the fluid current motor as set forth in claim 1, wherein each said framework arm additionally comprises a first leading portion stop bumper means rigidly mounted to said rotor arm at a point thereon above said leading portion of said upper rotor panel and adapted to restrictingly contact and support said upper rotor panel of each said pair of rotor panels on said upper surface of said leading portion of said upper rotor panel when said upper panel is pivoted to said non-resisting position; and a second leading portion stop bumper means rigidly mounted to said rotor arm at a point thereon below said leading portion of said lower rotor panel and adapted to restrictingly contact and support said lower rotor panel of each said pair of rotor panels on said lower surface of said leading portion of said lower rotor panel when said lower rotor panel is pivoted to said non-resisting position.

7. In the fluid current motor as set forth in claim 6, wherein each of said framework arms is provided with a pair of trailing portion stop bumper means, the first said trailing portion stop bumper means in each said pair rigidly mounted to said framework arm at a point thereon above the trailing portion of said upper rotor panel and adapted to restrictingly contact and support said upper panel of each said pair of panels at a point on said upper surface of said trailing portion of said upper panel when said upper panel is pivoted to a resisting position; and the second said trailing portion stop bumper means in each said pair rigidly mounted to said framework arm at a point thereon below the trailing portion of said lower rotor panel, and adapted to restrictingly contact and support said lower panel of each said pair of panels on said lower surface of said trailing portion of said lower panel when said lower panel is pivoted to a restricting portion.

8. In the fluid current motor as set forth in claim 7, wherein said first trailing portion stop bumper means comprises a first base portion rigidly mounted to said upper trailing horizontal member, and a first resilient rotor panel contact face portion rigidly mounted to said base portion, and said second trailing portion stop bumper means comprising a second base portion rigidly mounted to said lower trailing horizontal member and a second resilient rotor panel contact face portion rigidly mounted to said base portion.

9. In the fluid current motor as set forth in claim 7, wherein said first trailing portion stop bumper means comprises a first base portion rigidly mounted to said upper outer horizontal cross-member, a first resilient rotor panel contact portion, and first extendable means for securing connecting said first base portion with said first resilient rotor panel contact face portion; and said second trailing portion stop bumper means comprising a second base portion rigidly mounted to said lower outer horizontal cross-member, a second resilient rotor panel contact portion and second extendable means for securing connecting said second base portion with said second resilient rotor panel contact portion, said first and said second extendable means for securing extendable between a first position wherein said resilient portion is in contact respectively with said upper and said lower rotor panels in the maximum resisting positions thereof to a second position wherein said resilient portion is in contact respectively with said upper and said lower rotor panels in the non-resisting positions thereof.

10. In the fluid current motor as set forth in claim 3, wherein each of said framework arms is provided with an adjustable means for clamping said upper panel of each respective said pair of rotor panels, said clamp mounted to said upper outer rotor panel pivot support cross-member exteriorly of said parallelepiped framework arm, comprising a first anchor mount rigidly mounted to said upper outer rotor panel pivot support cross-member at a point thereon intermediate the length thereof, an elongated extensible shaft means for connecting having a first end pivotally mounted to said anchor mount and extending therefrom substantially toward the outer trailing vertical member to a second end, a rigid engaging clamp means having an elongated neck portion extending from a first end, said first end of said elongated neck portion pivotally mounted to said upper outer rotor panel pivot support cross-member and outwardly thereof, said first end rigidly connected to and carrying an outwardly extending extensible shaft interconnect means pivotally connected to said second end of said extensible shaft means, to a second end extending beyond the outer trailing vertical member said second end rigidly connected to and carrying an inwardly extending bifurcated panel gripping means, said adjustable means for clamping pivotally adjustable between a first position in which bifurcated panel gripping means restrictingly engaged about a portion of said trailing edge of said upper rotor panel when said upper rotor panel is in a non-resisting position to a second position in which said bifurcated panel gripping means is outwardly remote from said upper rotor pane.

* * * * *